(12) United States Patent
Bruguera et al.

(10) Patent No.: US 10,809,980 B2
(45) Date of Patent: Oct. 20, 2020

(54) SQUARE ROOT DIGIT RECURRENCE

(71) Applicant: ARM LIMITED, Cambridge (GB)

(72) Inventors: Javier Diaz Bruguera, Austin, TX (US); David M. Russinoff, Austin, TX (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/622,429

(22) Filed: Jun. 14, 2017

(65) Prior Publication Data

US 2018/0364983 A1 Dec. 20, 2018

(51) Int. Cl.
*G06F 7/552* (2006.01)

(52) U.S. Cl.
CPC ...... *G06F 7/552* (2013.01); *G06F 2207/5526* (2013.01)

(58) Field of Classification Search
CPC .............................. G06F 7/552; G06F 7/5525
See application file for complete search history.

(56) References Cited

U.S. PATENT DOCUMENTS

| | | | | |
|---|---|---|---|---|
| 6,847,985 B1* | 1/2005 | Gupta | ...................... | G06F 7/483 708/500 |
| 2013/0173683 A1* | 7/2013 | Carlough | .............. | G06F 7/5375 708/650 |
| 2016/0313976 A1* | 10/2016 | Dibrino | ...................... | G06F 7/52 |
| 2016/0328207 A1* | 11/2016 | Sexton | ...................... | G06F 7/463 |
| 2018/0121164 A1* | 5/2018 | Sexton | .................. | G06F 7/4824 |

OTHER PUBLICATIONS

Soderquist et al ("An Area/Performance Comparison of Subtractive and Multiplicative Divide/Square Root Implementations"), pp. 1-8. (Year: 1995).*

* cited by examiner

*Primary Examiner* — Chuong D Ngo
(74) *Attorney, Agent, or Firm* — Nixon & Vanderhye P.C.

(57) ABSTRACT

A data processing apparatus is provided, for performing a digit-recurrence square root operation on an input value. Receiver circuitry receives a remainder value of a previous iteration of the digit-recurrence square root operation. Comparison circuitry compares most significant bits of the remainder value of the previous iteration with a number of selection constants, in order to output a next digit of a result of the digit-recurrence square root operation. The comparison circuitry compares at most 3 fractional bits of the remainder value of the previous iteration with the plurality of selection constants.

12 Claims, 6 Drawing Sheets

| | | i=0 | i=1 | i=2 | i>2 |
|---|---|---|---|---|---|
| $l_0$ | k=2 | - | [48/32, 58/32] | [45/32, 54/32] | [48/32, 53/32] |
| | k=1 | - | [12/32, 22/32] | [12/32, 21/32] | [13/32, 21/32] |
| | k=0 | - | [-19/32, -11/32] | [-20/32, -11/32] | [-20/32, -12/32] |
| | k=-1 | - | [-46/32, -40/32] | [-50/32, -42/32] | [-51/32, -47/32] |
| $l_1$ | k=2 | - | - | [50/32, 61/32] | [52/32, 55/32] |
| | k=1 | - | - | [14/32, 24/32] | [14/32, 22/32] |
| | k=0 | - | - | [-22/32, -12/32] | [-21/32, -13/32] |
| | k=-1 | - | - | [-57/32, -48/32] | [-54/32, -51/32] |
| $l_2$ | k=2 | - | - | [56/32, 68/32] | [59/32, 62/32] |
| | k=1 | - | - | [15/32, 26/32] | [16/32, 24/32] |
| | k=0 | - | - | [-25/32, -14/32] | [-23/32, -15/32] |
| | k=-1 | - | - | [-64/32, -53/32] | [-60/32, -57/32] |
| $l_3$ | k=2 | - | - | [61/32, 74/32] | [64/32, 68/32] |
| | k=1 | - | - | [16/32, 29/32] | [17/32, 27/32] |
| | k=0 | - | - | [-28/32, -15/32] | [-26/32, -16/32] |
| | k=-1 | - | - | [-70/32, -58/32] | [-67/32, -63/32] |

FIG. 3

|  |  |  |  |  |
|---|---|---|---|---|
| $I_4$ | k=2 |  | [69/32, 85/32] | [66/32, 81/32] | [69/32, 75/32] |
|  | k=1 |  | [18/32, 32/32] | [18/32, 32/32] | [18/32, 30/32] |
|  | k=0 |  | [-30/32, -16/32] | [-30/32, -16/32] | [-29/32, -17/32] |
|  | k=-1 |  | [-73/32, -61/32] | [-77/32, -64/32] | [-74/32, -68/32] |
| $I_5$ | k=2 |  | - | [72/32, 88/32] | [75/32, 82/32] |
|  | k=1 |  | - | [19/32, 34/32] | [20/32, 32/32] |
|  | k=0 |  | - | [-33/32, -18/32] | [-31/32, -19/32] |
|  | k=-1 |  | - | [-84/32, -69/32] | [-80/32, -73/32] |
| $I_6$ | k=2 |  | - | [77/32, 94/32] | [80/32, 88/32] |
|  | k=1 |  | - | [20/32, 37/32] | [21/32, 35/32] |
|  | k=0 |  | - | [-36/32, -19/32] | [-34/32, -20/32] |
|  | k=-1 |  | - | [-90/32, -74/32] | [-87/32, -79/32] |
| $I_7$ | k=2 |  | - | [82/32, 101/32] | [85/32, 95/32] |
|  | k=1 |  | - | [22/32, 40/32] | [22/32, 38/32] |
|  | k=0 |  | - | [-38/32, -20/32] | [-37/32, -21/32] |
|  | k=-1 |  | - | [-97/32, -80/32] | [-94/32, -84/32] |
| $I_8$ | k=2 |  | [90/32, 112/32] | [88/32, 108/32] | [87/32, 102/32] |
|  | k=1 |  | [23/32, 43/32] | [23/32, 42/32] | [23/32, 40/32] |
|  | k=0 | [-38/32, -21/32] | [-40/32, -22/32] | [-41/32, -22/32] | [-39/32, -22/32] |
|  | k=-1 | [-83/32, -72/32] | [-100/32, -82/32] | [-104/32, -85/32] | [-100/32, -86/32] |

FIG. 3 (continued)

| | $m_2(j)$ | $m_1(j)$ | $m_0(j)$ | $m_{-1}(j)$ |
|---|---|---|---|---|
| $I_0$ | 48/32 = 12/8 | 16/32 = 4/8 | −16/32 = −4/8 | −48/32 = −12/8 |
| (i = 1) | | | | −44/32 = −11/8 |
| $I_1$ | 52/32 = 13/8 | 16/32 = 4/8 | −16/32 = −4/8 | −52/32 = −13/8 |
| (i = 2) | 60/32 = 15/8 | | | |
| $I_2$ | 60/32 = 15/8 | 16/32 = 4/8 | −16/32 = −4/8 | −60/32 = −15/8 |
| $I_3$ | 64/32 = 16/8 | 24/32 = 6/8 | −24/32 = −6/8 | −64/32 = −16/8 |
| $I_4$ | 72/32 = 18/8 | 24/32 = 6/8 | −24/32 = −6/8 | −72/32 = −18/8 |
| $I_5$ | 80/32 = 20/8 | 32/32 = 8/8 | −24/32 = −6/8 | −80/32 = −20/8 |
| $I_6$ | 80/32 = 20/8 | 32/32 = 8/8 | −32/32 = −8/8 | −80/32 = −20/8 |
| $I_7$ | 88/32 = 22/8 | 32/32 = 8/8 | −32/32 = −8/8 | −88/32 = −22/8 |
| $I_8$ | 96/32 = 24/8 | 32/32 = 8/8 | −32/32 = −8/8 | −96/32 = −24/8 |
| (i = 0) | | | | −80/32 = −20/8 |

FIG. 4

SQUARE ROOT DIGIT RECURRENCE

TECHNICAL FIELD

The present disclosure relates to data processing. More particularly, it relates to digit recurrence operations for determining square roots.

DESCRIPTION

Digit recurrence circuitry is circuitry in which the output from the circuitry is provided back as an input for a subsequent iteration of the circuitry. At each iteration, one or more digits of a final result is output. For example, the digit recurrence circuitry could be to produce the square root of an input number with a single digit being output at each iteration. Within such digit recurrence circuitry, it is necessary to determine what the next digit to be output is. Typically, this involves a selection function, SEL, in which an estimate of the partial result calculated so far is compared to a number of constants. Depending on how the partial result estimate compares to the constants, a different digit will be output. The constants themselves can be dependent on the partial result estimate, which can change from iteration to iteration. However, storing a large number of possible constants to be selected in dependence on the partial result estimate can result in large circuitry. Furthermore, as the partial result estimate increases in accuracy, the size of the circuitry also increases and its speed decreases.

It would therefore be desirable to have circuitry that only needs to select constants from a small pool of possible values that work in a majority of cases, while reducing the circuitry size and improving the circuitry speed.

SUMMARY

Viewed from a first example configuration, there is provided a data processing apparatus to perform a digit-recurrence square root operation on an input value, comprising: receiver circuitry to receive a remainder value of a previous iteration of said digit-recurrence square root operation; and comparison circuitry to compare most significant bits of said remainder value of said previous iteration with a plurality of selection constants, to output a next digit of a result of said digit-recurrence square root operation, wherein said comparison circuitry compares at most 3 fractional bits of said remainder value of said previous iteration with said plurality of selection constants.

Viewed from a second example configuration, there is provided a data processing method for performing a digit-recurrence square root operation on an input value, comprising: receiving a remainder value of a previous iteration of said digit-recurrence square root operation; and comparing most significant bits of said remainder value of said previous iteration with a plurality of selection constants, to output a next digit of a result of said digit-recurrence square root operation, wherein said comparing compares at most 3 fractional bits of said remainder value of said previous iteration with said plurality of selection constants.

Viewed from a third example configuration, there is provided a data processing apparatus to perform a digit-recurrence square root operation on an input value, comprising: means for receiving a remainder value of a previous iteration of said digit-recurrence square root operation; and means for comparing most significant bits of said remainder value of said previous iteration with a plurality of selection constants, for outputting a next digit of a result of said digit-recurrence square root operation, wherein said means for comparing compares at most 3 fractional bits of said remainder value of said previous iteration with said plurality of selection constants.

BRIEF DESCRIPTION OF THE DRAWINGS

The present invention will be described further, by way of example only, with reference to embodiments thereof as illustrated in the accompanying drawings, in which:

FIG. 3 shows a table providing ranges of values for selection constants in accordance with one embodiment;

FIG. 4 shows a table providing selection constants in accordance with one embodiment.

DESCRIPTION OF EXAMPLE EMBODIMENTS

Figure 1:
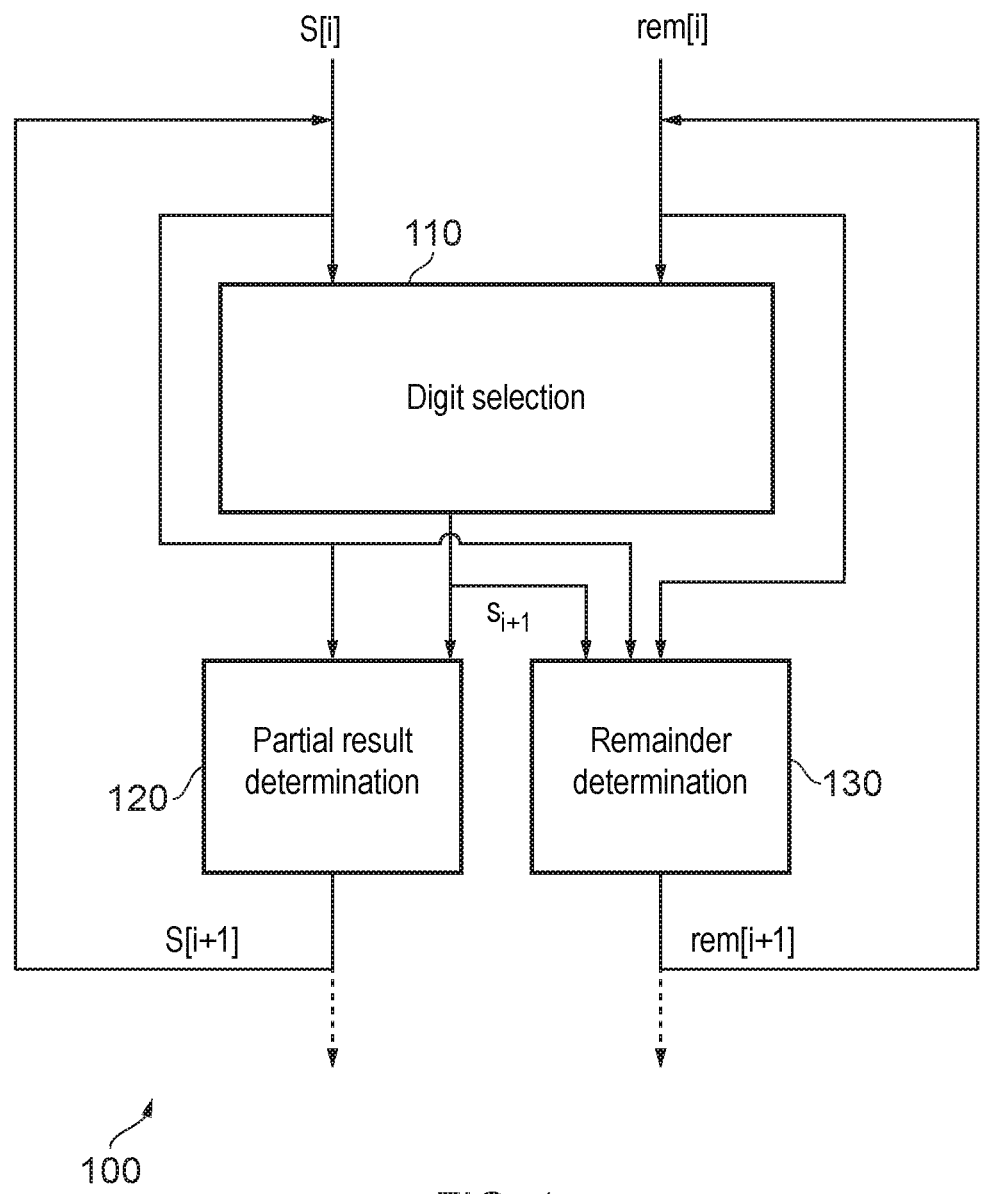
FIG. 1 illustrates digit recurrence circuitry comprising digit selection circuitry in accordance with one embodiment.

Before discussing the embodiments with reference to the accompanying figures, the following description of embodiments is provided.

In accordance with one example configuration there is provided a data processing apparatus to perform a digit-recurrence square root operation on an input value, comprising: receiver circuitry to receive a remainder value of a previous iteration of said digit-recurrence square root operation; and comparison circuitry to compare most significant bits of said remainder value of said previous iteration with a plurality of selection constants, to output a next digit of a result of said digit-recurrence square root operation, wherein said comparison circuitry compares at most 3 fractional bits of said remainder value of said previous iteration with said plurality of selection constants.

In digit recurrence, an operation is performed over a number of iterations. Each iteration, a digit of the result is obtained. Each digit represents a given number of bits. In a radix-r implementation, a digit is $\log_2(r)$ bits. Accordingly, this number of bits is obtained every iteration. Receiver circuitry is provided to receive a remainder value from a previous iteration of the operation. Additionally, the receiver circuitry may receive an initial value for a first iteration. Most significant bits of the remainder value received from the receiver circuitry are compared to a number of selection constants. In this way, an estimate of the remainder value received by the receiver circuitry is compared to the selection constants. Based on this selection, a next digit of the result is output. In the above, the comparison circuitry is such that it compares at most three fractional bits of the remainder value received by the receiver circuitry. Typically, these bits will be the three most significant fractional bits. In addition, non fractional bits may also be considered. For example, any number of integer bits may be considered along with the three most significant fractional bits of the remainder value received by the receiver circuitry at each iteration. This may be true for every iteration performed by the data processing apparatus. By comparing such a small number of fractional bits, it is possible for the circuitry to be simplified as compared to a situation where a larger number of fractional bits must be considered. Typically, the number of bits that can make up any integer value is limited. In addition, as a consequence of reducing the number of fractional bits that are considered, the number of possible values of the constants can also be reduced. By reducing a number of possible constant values, it is possible to reduce the size and therefore the power consumption of the circuitry.

In some embodiments there is provided remainder determination circuitry to determine a remainder value of a current iteration based on said remainder value of said previous iteration, and a partial result of said digit-recurrence square root operation, and to provide said remainder value of said current iteration to said receiving circuitry. The remainder determination circuitry is able to determine a remainder value for the current iteration. This is based on both the remainder value of the previous iteration as well as the partial result after having been modified by the output of the comparison circuitry. The new remainder value calculated by the remainder determination circuitry is passed back to the receiver circuitry in order to use the new remainder value in a further iteration of the digit recurrence square root operation.

In some embodiments, said receiver circuitry is further configured to receive a partial result of said digit-recurrence square root operation from a previous iteration; and said comparison circuitry is further configured to select one of a plurality of subsets of said plurality of selection constants to compare to said 3 fractional bits of said remainder value based on most significant bits of said partial result of said digit-recurrence square root operation from a previous iteration. The receiver circuitry receives a partial root of the digit recurrence square root operation from a previous iteration. In the case of a first iteration, the receiver circuitry may also receive an initial value of the partial root. The comparison circuitry selects one of a plurality of subsets of the plurality of selection constants to compare to the three fractional bits of the remainder value. The selection of the subset of selection constants is made on the basis of most significant bits of the partial result of the digit recurrence square root operation from a previous iteration. In particular, the previous iteration may have been the immediately previous operation.

In some embodiments, said subset of said plurality of selection constants has a number of elements dependent on a digit set of said next digit. The digit set of the next digit relates to the radix r of the square root operation being performed. In particular, for most iterations, the digit set for a radix 4 may be −2, −1, 0, 1, or 2. As the digit set grows in size, the number of selection constants increases since the number of comparisons necessary in order to find the correct output digit will also increase.

In some embodiments, said subset of said plurality of selection constants has one element for each element of said digit set, minus 1. For example, considering the previous case for a radix r of 4, where the digit set comprises the values −2, −1, 0, 1, or 2, i.e. where there are five possible digits in the digit set, the number of selection constants is equal to 5−1=4. Typically, the selection constants will be ordered in descending size. The estimate of the remainder value from the previous iteration will then be successfully compared to each of the selection constants in descending order. If the estimate of the remainder value from the previous iteration is larger than the selection constant being compared, then the output digit corresponds with the digit associated with that selection constant.

In some embodiments, said plurality of subsets comprises a number of subsets dependent on a number of said most significant bits of said partial result of said digit-recurrence square root operation from a previous iteration. When considering the most significant bits of the partial result of the digit recurrence square root operation from a previous iteration (i.e. when considering an estimate of the partial result), the estimate is effectively a truncation of the actual value of the partial result. This has the effect of dividing the value into a number of intervals. For each interval a different set of constants may be provided. In other words, there may be a number of subsets of constants dependent on the number expressed by the most significant bits. For example, when considering four fractional bits of the partial result, there may be nine such intervals made up of intervals $I_0$ to $I_7$, plus a special interval $I_8$ for the case where the digits are all zero, such as in the initial iteration where the partial root is 1.0.

In some embodiments, said plurality of subsets comprises a number of subsets equal to $2^{n-1}+1$, wherein n is equal to the number of most significant fractional bits of said partial result of said digit-recurrence square root operation from a previous iteration. In particular, in some embodiments, said plurality of subsets consists of a number of subsets equal to $2^{n-1}+1$, wherein n is equal to the number of most significant fractional bits of said partial result of said digit-recurrence square root operation from a previous iteration. In this way, the number of subsets of selection constants may be limited. This has the advantage that the circuit size and therefore the power consumption can be kept relatively small as opposed to systems where a larger number of subsets of selection constants are required.

In some embodiments, said comparison circuitry comprises deviation circuitry to replace a single selection constant in said one of said plurality of subsets in response to a current iteration of said digit-recurrence square root operation being a predetermined iteration. The deviation circuitry makes it possible for a single selection constant in said one of said plurality of subsets to be replaced with another. In this way, rather than storing two subsets of selection constants that differ by a single selection constant, it is possible to store only the subset and a deviant or replacement value. The deviant value will replace one of the values of the subset in response to a current iteration of the square root operation being a predetermined operation. In other words, at a particular iteration of the operation, the deviant value will replace a existing value in the subset.

In some embodiments, said deviation circuitry is responsive to at most three situations in which a single selection constant in said one of said plurality of subsets is replaced. Consequently, the number of deviations that are stored is also limited. Since the deviations must also be stored together with a situation in which the deviation value replaces another value in a subset, thereby reducing the storage requirements of the comparison circuitry.

In some embodiments, said comparison circuitry is further configured to select said one of a plurality of subsets independently of a current iteration. By selecting the selected one of the plurality of subsets independently of a current iteration, there is no requirement to include different subsets of selection constants for different iteration numbers. Consequently, the overall number of the plurality of selection constants can be kept low, thereby keeping the circuit size and therefore power consumption low as well.

In some embodiments, a radix of said digit-recurrence square root operation is 4. The radix can dictate the number of bits output at each iteration of the digit-recurrence algorithm. For example, for a radix of four, since two bits are necessary to represent each digit, two bits are output at each iteration.

In some embodiments, said plurality of selection constants are exclusively selected from the values: 12/8, 13/8, 15/8, 16/8, 18/8, 20/8, 22/8, 24/8, 4/8, 6/8, 8/8, −4/8, −6/8, −8/8, −12/8, −11/8, −13/8, −15/8, −16/8, −18/8, −20/8, −22/8, and −24/8 or numerical equivalents thereof. Two numbers are considered to be numerically equivalent if they are equal to each other. For example, the value 4/8 is numerically equivalent to the values ½ and 8/16. The constants listed enable a selection of selection constants in which only three fractional bits are required. Furthermore, with only three exceptions, the same set of selection constants can be used across all iterations. For those three exceptions, deviation values can be provided.

Particular embodiments will now be described with reference to the figures.

FIG. 1 illustrates digit recurrence circuitry 100 comprising digit selection circuitry 110 (which is an example of a data processing apparatus) in accordance with one embodiment. At each iteration i+1, the digit selection circuitry 110 receives as inputs a partial result (partial root) calculated as of iteration i, and a remainder value as calculated from iteration i. In this way, the inputs to the digit selection are the calculated partial result and the calculated remainder value from the previous iteration. As shown in FIG. 1, in a first iteration, specific values S[0], rem[0] are provided to the digit selection circuitry 110. In particular, S[0]=1 and rem[0]=x−1, where x is the input value to the data processing apparatus 100, i.e. the value whose square root is being calculated, which may have been shifted once such that the exponent of the value is even.

The digit selection circuitry 110 selects a next digit $s_{i+1}$ for the partial result. The digit selection circuitry 110 will be discussed in more detail with reference to FIG. 2. With the next digit $S_{i+1}$ having been calculated, it is passed to partial result determination circuitry 120 and remainder determination circuitry 130.

The partial result determination circuitry 120 receives as inputs the partial result from the previous iteration S[i] and the next digit $s_{i+1}$ calculated by the digit selection circuitry 110. The partial result determination circuitry determines the new partial result S[i+1] by the equation:

$$S[i+1]=S[i]+s_{i+1}r^{-(i+1)}$$

Where r is the radix (e.g. 4) and i is the iteration number (starting from 0).

The remainder determination circuitry 130 receives as inputs the partial result from the previous iteration S[i], the next digit $s_{i+1}$ calculated by the digit selection circuitry 110 and the remainder from the previous iteration rem[i]. The remainder determination circuitry determines the new remainder rem[i+1] by the equation:

$$rem[i+1]=rem[i]r-s_{i+1}(S[i]+s_{i+1}r^{-(i+1)})$$

Where, again, r is the radix (e.g. 4) and i is the iteration number (starting from 0).

Each of the outputs produced by the partial result determination circuitry 120 and the remainder determination circuitry 130, S[i+1], rem[i+1] can be provided back to the digit selection circuitry 110 for a further iteration. Once the partial result has reached a desired level of accuracy, the partial result and the remainder value can be read out and/or provided to rounding circuitry to produce a final rounded result.

Note that at various points in the digit recurrence circuitry 100, a value may be passed from one circuitry to another in redundant representation. Redundant representation uses a pair of words in order to represent a single value. For example, one word could represent a positive value and the second word could represent a negative value. In another embodiment, one word could represent a sum value and a second word could represent a carry value. Redundant representation can enable certain operations to be performed more efficiently. A non-redundant representation can be derived by addition of the two redundant representation values.

Figure 2:
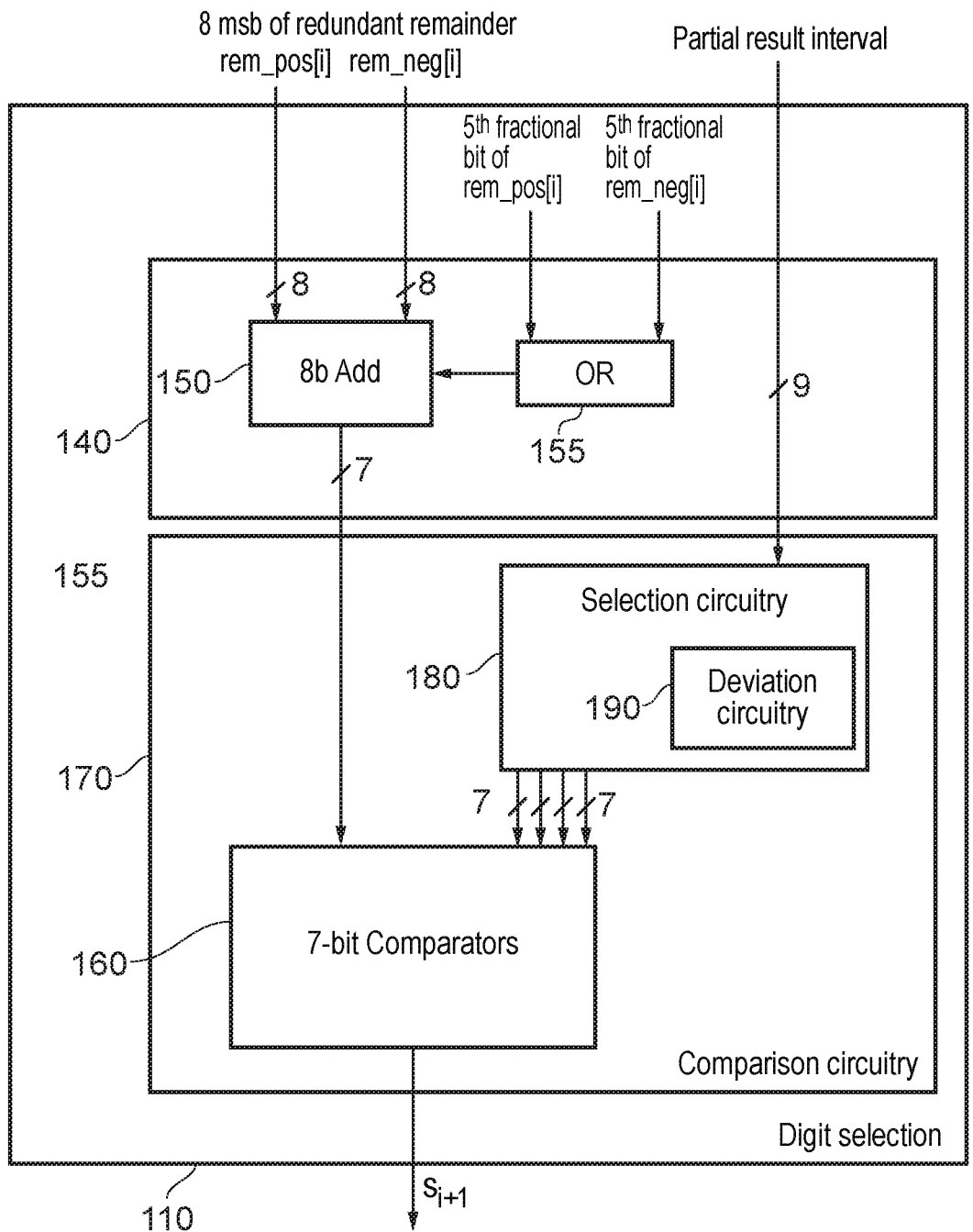
FIG. 2 illustrates digit selection circuitry in accordance with one embodiment.

FIG. 2 illustrates the digit selection circuitry 110 in more detail. The digit selection circuitry performs a selection function (SEL), which provides the next digit $s_{i+1}$ of the partial result after iteration i+1.

The remainder of the previous iteration rem[i] affects the digit that will be selected at the current iteration. In particular, as the remainder of the previous iteration rem[i] increases, the digit output for the current iteration will also increase. In the present embodiment, rather than consider the remainder value of the previous iteration rem[i] in its entirety, which would be time consuming, the circuitry considers only an estimate of the remainder value of the previous iteration $\widehat{rem[i]}$. In this embodiment, the remainder estimate is produced by taking the nine bits of the remainder value of the previous iteration rem[i] to produce $\widehat{rem[i]}$. These nine bits include four integer bits and t (e.g. 5) most significant fractional bits. Rather than using a 9-bit adder, the addition can be performed using an 8-bit adder 150, as explained below.

To determine the output digit, $\widehat{rem[i]}$ is compared to a number of selection constants that define boundaries of $\widehat{rem[i]}$ for each possible output digit. Depending on how $\widehat{rem[i]}$ compares to these selection constants, the output digit will change.

Also in this embodiment, $\widehat{rem[i]}$ is received in redundant representation, and so the 8-bit adder 150 is provided to add the two words together to convert from redundant representation to non-redundant representation. Similarly, OR circuitry 155 is used to determine the carry signal, which is produced from the 5$^{th}$ fractional bits of the remainder estimate from the last iteration $\widehat{rem[i]}$. The result is then passed to comparators 160 of the comparison circuitry 170. Note that in this embodiment, as will be discussed later, the comparison constants are only seven bits (four integer bits and three fractional bits). Accordingly, although an 8-bit adder is used, only the seven most significant bits from the 8-bit adder 150 are provided to the comparators 160 because only seven bits are required for comparison. The least significant bit is discarded.

In a square-root digit recurrence algorithm, the selection constants that are used to determine an output digit k can change at each iteration i. In particular if each possible output digit has a selection constant associated with it, then the next output digit is determined by comparing the remainder value from the previous iteration (or an estimate of the remainder value of a previous iteration) to the selection constants in order to determine which possible output digit should be output next. The selection constant for a digit k falls within the boundary $\{L_k, U_k\}$, where $U_{k-1} \geq L_k$ and:

$$L_k[i]=2S[i](k-\rho)+(k-\rho)^2 r^{-(i+1)}$$

$$U_k[i]=2S[i](k+\rho)+(k+\rho)^2 r^{-(i+1)}$$

where ρ is the redundancy factor $$\rho = \frac{a}{r-1},$$

r is the radix (e.g. 4), and a is the maximum value of the digit set (e.g. 2). Note that if $U_k=L_k$ then the selection constant=$L_k$=$U_k$.

As is clear from the above equations, the boundaries $L_k$, $U_k$ for each selection constant are dependent on the partial result S[i], which is therefore also dependent on the iteration number i. The selection constants are grouped into a number of sets (one set for each iteration number i). Depending on the iteration number, one of the sets of selection constants is selected by the selection circuitry 180 and then provided to the comparators 160 in the comparison circuitry 170. $\widehat{rem}[i]$ is then compared to one or more of the selection constants in the selected set and based on the comparison(s), a next digit $s_{i+1}$ is provided.

In the present embodiment, the selection constants for a radix of 4 are such that a single set of selection constants can be used for all iterations, with only three deviations. Consequently, only a small number of selection constants need to be stored (therefore reducing the storage requirements of the selection circuitry). Furthermore, the selection constants can all be described as a number of eighths (i.e. they use three fractional bits). Consequently, the complexity of the comparisons is reduced compared to circuitry where many more fractional bits are required (therefore speeding up the comparisons that are performed).

Deviation circuitry 190 handles the case the above mentioned deviations. In particular, where three sets of selection constants are similar, e.g. differ by only one value, rather than providing the three sets of selection constants, it is possible to provide only a single set, together with details of the values to be replaced and the conditions in which the replacement occurs. This can lead to lower storage requirements as compared to the situation where every set must be stored, regardless of the similarities between sets.

The derivation of the selection constants used in the present embodiment are now discussed with reference to FIGS. 3 and 4.

In practice, rather than the comparison circuitry 170 performing a comparison on S[i], which would be time consuming due to the number of bits involved, the selection circuitry 170 instead uses an estimate of S[i], $\widehat{S[i]}$. In this embodiment, the estimate is derived by considering only the five (1+n) most significant bits of S[i]. The five bits are made up from one integer bit and n (e.g. 4) fractional bits. The possible range of S[i] is thereby broken up into a number of intervals. In particular each interval $I_j$ is defined by the equation:

$$2^{-1}+j\times 2^{-n}-\rho\times 2^{-n} < S[i] < 2^{-1}+j\times 2^{-n}+\rho\times 2^{-n}, 0\le j \le 2^{n-1}-1$$

Note that a special extra interval is provided. The partial root can be in this interval when the fractional digits are all zero. For example, this interval will apply for the initial iteration where the partial root is 1.0.

As a consequence of $\widehat{S[i]}$ having a particular range, and the true value S[i] lying somewhere within that range, the appropriate selection constants to compare against $\widehat{rem}[i]$ also exist within a range of possible values. In particular:

$$\max([\hat{L}_k(I_j)]_t)\le m_k(j)\le \min([\hat{U}_{k-1}(I_j)]_t)$$

where $m_k(j)$ is the selection constant associated with an output digit k for an interval number j, $\hat{L}_k(I_j)$ is an estimate of the lower boundary associated with output digit k for interval number j, $\hat{U}_{k-1}(I_j)$ is an estimate of the upper boundary associated with output digit k for interval number j, and t is the number of fractional bits used in $\widehat{rem}[i]$.

It has been determined that it is not possible to provide a single set of selection constants (with no deviations) for all iterations using a radix of 4. Instead, a value H is found so that a single set of selection constants can be provided where i≥H and the cases for i<H are considered separately.

In the present embodiment, it is noted that for i<3, $\widehat{S[i]}$=S[i] because the number of fractional bits in S[i] is less than or equal to the number of fractional bits in $\widehat{S[i]}$. In particular:

S[0]=1, which corresponds with interval $I_8$.

S[1]=1.xy because only one fractional digit has been determined. Moreover, the first digit with radix 4 has to be negative or zero and so S[1]=1, 0.75, or 0.5, which corresponds with intervals $I_8$, $I_4$, and $I_0$ respectively.

S[2]=1.xyzw because only two fractional digits have been determined. Again, since the first digit must be negative or zero for radix 4, S[2]=0.5+j×$2^{-4}$, which corresponds with interval $I_j$.

Accordingly, the value for H is set at 3. Consequently, the maximum lower boundary and minimum upper boundaries when i<H, are calculated as follows:

For k>0:

$$\max(\hat{L}_k(I_j))=2\times\max(\hat{S}[i])\times(k-\rho)+(k-\rho)^2\times 4^{-(i+1)}+2^{-t}$$

$$\min(\hat{U}_{k-1}(I_j))=2\times\min(\hat{S}[i])\times(k-1+\rho)+(k-1+\rho)^2\times 4^{-(i+1)}$$

For k≤0:

$$\max(\hat{L}_k(I_j))=2\times\min(\hat{S}[i])\times(k-\rho)+(k-\rho)^2\times 4^{-(i+1)}+2^{-t}$$

$$\min(\hat{U}_{k-1}(I_j))=2\times\max(\hat{S}[i])\times(k-1+\rho)+(k-1+\rho)^2\times 4^{-(i+1)}$$

To have a single selection function for every iteration i≥H expressions independent on i have to be derived. Note that the term depending on i, $4^{-(i+1)}$ will be positive and approach zero for as the value of i increases. Since the term is positive, when calculating min ($\hat{U}_{k-1}(I_j)$), this value can be disregarded. In contrast, when calculating max ($\hat{L}_k(I_j)$), the term cannot be disregarded. Instead, the maximum value (i=H) must be used. Hence, when i≥H, the following equations must be used:

For k>0:

$$\max(\hat{L}_k(I_j))=2\times\max(\hat{S}[i])\times(k-\rho)+(k-\rho)^2\times 4^{-(H+1)}+2^{-t}$$

$$\min(\hat{U}_{k-1}(I_j))=2\times\min(\hat{S}[i])\times(k-1+\rho)$$

For k≤0:

$$\max(\hat{L}_k(I_j))=2\times\min(\hat{S}[i])\times(k-\rho)+(k-\rho)^2\times 4^{-(H+1)}+2^{-t}$$

$$\min(\hat{U}_{k-1}(I_j))=2\times\max(\hat{S}[i])\times(k-1+\rho)$$

Using this data in the case of radix-4, for each interval $I_0$ to $I_8$, for output digits k={2, 1, 0, -1} and for each iteration i=0, i=1, i=2, i>3 results in the min ($\hat{U}_{k-1}(I_j)$), max ($\hat{L}_k(I_j)$) values shown in FIG. 3. Note that a selection constant for the digit-2 is not necessary. In particular, if the remainder estimate is less than the constant for k=−1 then the output digit is −2. That is, the number of selection constants needed is one less than the number of possible output digits.

For example, consider the case where i=1, j=4, and k=2. For S[1], the exact value is known because the number of fractional bits in S[i] (two) is less than the number of fractional bits in $\widehat{S[i]}$(four). We can therefore determine the exact value of S[i] via the equation S[1]=0.5+j×$2^{-4}$=0.5+ 0.25=0.75. Since this is the exact value, it is also the value of max($\hat{S}[i]$) and also min($\hat{S}[i]$). In fact, for S[1], there are only three possible values: ½, ¾, and 1 with the corresponding intervals being $I_0$, $I_4$, and $I_8$.

Since i (1) is less than H (3), and since k>0, we use the equations:

$$\max(\hat{L}k(I_j)) = 2 \times \max(\hat{S}[i]) \times \left(2 - \frac{2}{3}\right) + \left(2 - \frac{2}{3}\right)^2 \times 4^{-(i+1)} + 2^{-t}$$

$$\max(\hat{L}_k(I_j)) = 2 \times \frac{3}{4} \times (k - \rho) + (k - \rho)^2 \times 4^{-(i+1)} + 2^{-t}$$

$$\max(\hat{L}_k(I_j)) = 2 \times \frac{3}{4} \times \frac{4}{3} + \left(\frac{4}{3}\right)^2 \times 4^{-2} + 2^{-5}$$

$$\max(\hat{L}_k(I_j)) = 2 + 3^{-2} + 2^{-5} = 2.14236111$$

Therefore: $\max\left(\left[\hat{L}_k(I_j)\right]_t\right) = \lceil 32(2.14326111) = 68.5555 \rceil = 69$ $$\min(\hat{U}_{k-1}(I_j)) = 2 \times \min(\hat{S}[i]) \times (k - 1 + \rho) + (k - 1 + \rho)^2 \times 4^{-(i+1)}$$

$$\min(\hat{U}_{k-1}(I_j)) = 2 \times \frac{3}{4} \times \left(2 - 1 + \frac{2}{3}\right) + \left(2 - 1 + \frac{2}{3}\right)^2 \times 4^{-(i+1)}$$

$$\min(\hat{U}_{k-1}(I_j)) = \frac{6}{4} \times \frac{5}{3} + \left(\frac{5}{3}\right)^2 \times 4^{-(i+1)} = \frac{30}{12} + \frac{25}{9} \times 4^{-2} = \frac{385}{144}$$

Therefore: $\min\left(\left\lfloor \hat{U}_{k-1}(I_j)\right\rfloor_t\right) = \left\lfloor 32\left(\frac{385}{144}\right)\right\rfloor = 85$ Given all of the ranges of possible selection constants for each value of i, j, and k, the set of selection constants shown in FIG. 4 are selected. These selection constants have the advantage that they are all a multiple of eights, therefore requiring only three fractional bits for a comparison, and with three exceptions (i=1, j=0, k=−1), (i=2, j=1, k=2), and (i=0, j=8, k=−1) the same selection constants can be used for all iterations.

Two of the exceptions are related to the selection of root digit equal to $s_{j+1}=-1$. The third exception is the selection of root digit equal to $s_{j+1}=2$ at iteration i=2 and partial root interval $I_1$. Using the previous definition for an interval with an estimate of the partial root $\hat{S}[i]$:

$$2^{-1} + j \times 2^{-n} - \rho \times 2^{-n} < \hat{S}[i] < 2^{-1} + j \times 2^{-n} + \rho \times 2^{-n}, 0 \leq j \leq 2^{n-1} - 1$$

$m_2(1)$ at iterations i≥3 has four fractional bits. However, a more detailed analysis of the maximum error shows that if $m_2(1)$ at iteration i=2 is made equal to 15/8 then max($\hat{S}[i]$)=113/192, and then the bound $m_2(1)$=13/8 can be chosen for iterations i≥3.

Figure 5:
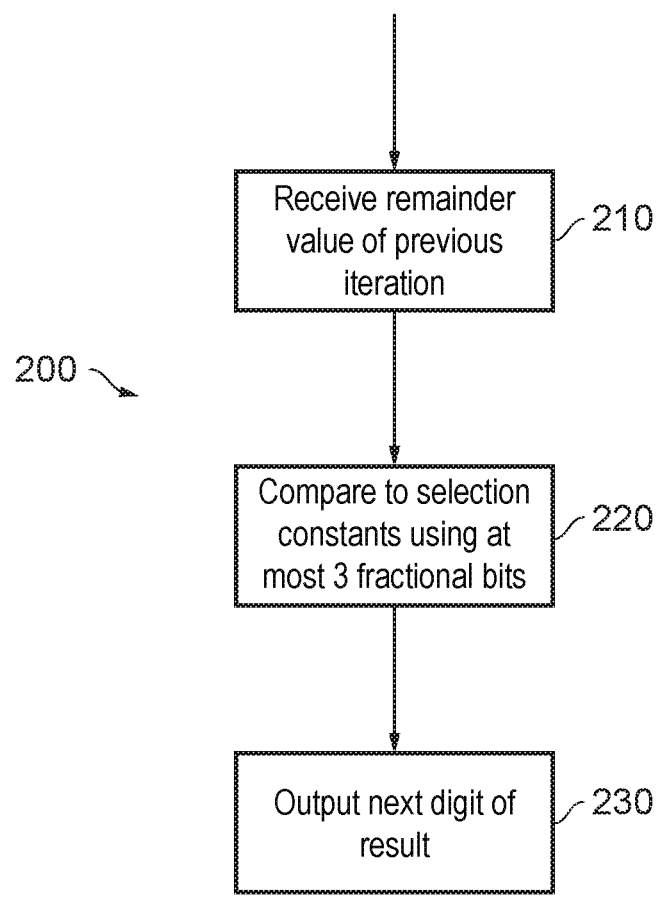
FIG. 5 provides a flow chart illustrating a method of data processing in accordance with one embodiment.

FIG. 5 provides a flow chart 200 illustrating a method of data processing in accordance with one embodiment. The method is used for performing a digit-recurrence square root operation. At a step 210, a remainder value from a previous iteration (rem[i]) is received. At a step 220, a comparison is performed based on the remainder value from the previous iteration and a set of selection constants. The comparison is performed using at most three fractional bits. Finally, at step 230, the next digit of the square root operation is output.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus to perform a digit-recurrence square root operation on an input value, comprising:
   receiver circuitry to receive a remainder value of a previous iteration of said digit-recurrence square root operation, and a partial result of said digit-recurrence square root operation from a previous iteration; and
   comparison circuitry comprising comparators configured to communicate with said receiver circuitry and to compare most significant bits of said remainder value of said previous iteration of said digit-recurrence square root operation with a plurality of selection constants of said digit-recurrence square root operation, to output a next digit of a result of said digit-recurrence square root operation,
   said comparison circuitry further comprising selection circuitry to select one of a plurality of subsets of said plurality of selection constants to compare to a predetermined number of fractional bits of said remainder value based on most significant bits of said partial result of said digit-recurrence square root operation from a previous iteration; and
   storage circuitry, accessible to said selection circuitry, to store said plurality of selection constants of said digit-recurrence square root operation, wherein:
   said most significant bits of said remainder value comprise said predetermined number of fractional bits,
   said predetermined number is at most 3, and
   said selection constants comprise at most 3 fractional bits
   said comparison circuitry comprises deviation circuitry to replace a single selection constant in said one of said plurality of subsets in response to a current iteration of said digit-recurrence square root operation being a predetermined iteration.

2. A data processing apparatus according to claim 1, comprising:
   remainder determination circuitry to determine a remainder value of a current iteration based on said remainder value of said previous iteration, and a partial result of said digit-recurrence square root operation, and to provide said remainder value of said current iteration to said receiving circuitry.

3. A data processing apparatus according to claim 1, wherein
   said subset of said plurality of selection constants has a number of elements dependent on a digit set of said next digit.

4. A data processing apparatus according to claim 3, wherein
   said subset of said plurality of selection constants has one element for each element of said digit set, minus 1.

5. A data processing apparatus according to claim 1, wherein
   said plurality of subsets comprises a number of subsets dependent on a number of said most significant bits of said partial result of said digit-recurrence square root operation from a previous iteration.

6. A data processing apparatus according to claim 1, wherein
said plurality of subsets comprises a number of subsets equal to $2^{n-1}+1$, wherein n is equal to the number of most significant fractional bits of said partial result of said digit-recurrence square root operation from a previous iteration.

7. A data processing apparatus according to claim 1, wherein
said plurality of subsets consists of a number of subsets equal to $2^{n-1}+1$, wherein n is equal to the number of most significant fractional bits of said partial result of said digit-recurrence square root operation from a previous iteration.

8. A data processing apparatus according to claim 7, wherein
said comparison circuitry is further configured to select said one of a plurality of subsets independently of a current iteration.

9. A data processing apparatus according to claim 1, wherein
said deviation circuitry is responsive to at most three situations in which a single selection constant in said one of said plurality of subsets is replaced.

10. A data processing apparatus according to claim 1, wherein
a radix of said digit-recurrence square root operation is 4.

11. A data processing apparatus according to claim 1, wherein
said plurality of selection constants are exclusively selected from the values: 12/8, 13/8, 15/8, 16/8, 18/8, 20/8, 22/8, 24/8, 4/8, 6/8, 8/8, −4/8, −6/8, −8/8, −12/8, −11/8, −13/8, −15/8, −16/8, −18/8, −20/8, −22/8, and −24/8 or numerical equivalents thereof.

12. A data processing method for performing a digit-recurrence square root operation on an input value, comprising:
receiving, by receiver circuitry, a remainder value of a previous iteration of said digit-recurrence square root operation, and a partial result of said digit-recurrence square root operation from a previous iteration;
comparing, by comparison circuitry including comparators communicating with said receiver circuitry, most significant bits of said remainder value of said previous iteration of said digit-recurrence square root operation with a plurality of selection constants of said digit-recurrence square root operation, to output a next digit of a result of said digit-recurrence square root operation;
selecting, by selection circuitry included the comparison circuitry, one of a plurality of subsets of said plurality of selection constants to compare to a predetermined number of fractional bits of said remainder value based on most significant bits of said partial result of said digit-recurrence square root operation from a previous iteration; and
storing, by storage circuitry accessible to said selection circuitry, said plurality of selection constants of said digit-recurrence square root operation, wherein:
said most significant bits of said remainder value comprise said predetermined number of fractional bits,
said predetermined number is at most 3,
said selection constants comprise at most 3 fractional bits, and
said step of comparing comprises replacing a single selection constant in said one of said plurality of subsets in response to a current iteration of said digit-recurrence square root operation being a predetermined iteration.

* * * * *